United States Patent [19]

Beall et al.

[11] 3,931,438

[45] Jan. 6, 1976

[54] DIFFERENTIAL DENSIFICATION STRENGTHENING OF GLASS-CERAMICS

[75] Inventors: George H. Beall, Big Flats; Kenneth Chyung, Elmira, both of N.Y.

[73] Assignee: Corning Glass Works, Corning, N.Y.

[22] Filed: Nov. 7, 1973

[21] Appl. No.: 413,544

Related U.S. Application Data

[63] Continuation-in-part of Ser. No. 196,593, Nov. 8, 1971, abandoned.

[52] U.S. Cl. .............. 428/218; 428/212; 428/428; 156/84; 156/85; 65/33; 65/30
[51] Int. Cl.² ................. B32B 7/02; B32B 17/06; C03B 32/00
[58] Field of Search ...... 161/193, 192, 164; 156/84, 156/85, 86; 65/33, 30; 428/218, 426, 428, 212

[56] References Cited
UNITED STATES PATENTS

| | | | |
|---|---|---|---|
| 1,960,121 | 5/1934 | Moulton | 65/41 X |
| 2,157,100 | 5/1939 | Roland | 117/125 X |
| 3,253,975 | 5/1966 | Olcott et al. | 65/33 X |
| 3,573,020 | 3/1971 | Karstetter | 65/33 X |
| 3,582,385 | 6/1971 | Duke et al. | 65/33 X |
| 3,637,453 | 1/1972 | Simmons | 161/164 X |
| 3,673,049 | 6/1972 | Giffin et al. | 161/164 |
| 3,756,798 | 9/1973 | Ernsberger | 65/33 |
| 3,764,444 | 10/1973 | Simmons | 161/164 X |
| 3,779,856 | 12/1973 | Pirooz | 161/164 |

FOREIGN PATENTS OR APPLICATIONS

846,721   7/1970   Canada

*Primary Examiner*—George F. Lesmes
*Assistant Examiner*—Alan T. McDonald
*Attorney, Agent, or Firm*—Kees van der Steere; Clinton S. Janes, Jr.; Clarence R. Patty, Jr.

[57] ABSTRACT

A strengthened glass-ceramic laminated article having a compressively-stressed surface layer substantially enveloping a tensilely-stressed core portion, produced by choosing the core and surface layer compositions such that the core undergoes a net positive differential densification with respect to the surface layer as the result of phase transformations occurring in the laminated article during crystallization in situ. Such an article offers significant advantages over glass and glass-ceramic articles strengthened by prior art methods, including improved mechanical stability, thermal shock resistance, and, most importantly, excellent high temperature strength retention.

4 Claims, 3 Drawing Figures

DIFFERENTIAL DENSIFICATION STRENGTHENING OF GLASS-CERAMICS

CROSS REFERENCE TO RELATED APPLICATION

This application is a continuation-in-part of our copending application Ser. No. 196,593, filed November 8, 1971, now abandoned.

BACKGROUND OF THE INVENTION

It is well known in the glass art that glass is quite strong under compressive stress, and that, ordinarily, glass breakage occurs as the result of tensile stress being applied to some portion of the glass article. It is primarily under tensile stress that surface cracks or defects propagate readily into the interior of the article to cause breakage. Most well-known glass-strengthening methods take advantage of this characteristic by providing a compressively-stressed surface layer on the glass article to be strenghtened. The compressive stress inhibits the propagation of surface cracks into the article and must be overcome by large counterbalancing tensile stresses before crack propagation and failure will occur.

Recent methods of providing such compressively-stressed surface layers include ion-exchange strengthening. Ion exchange methods generally involve contacting the surface of the glass to be strengthened with a source of exchangeable ions at elevated temperatures to cause the migration of ions from that source into the glass in exchange for certain ions from the glass. In this way, the composition of the surface layer of glass is changed so that a compressively-stressed region is formed which adds considerably to the strength of the article. Such a procedure suffers from several major disadvantages. It usually involves the use of molten salts at elevated temperatures to provide a source of exchangeable ions, and is, therefore, hazardous and expensive. It also provides a rather thin compressively-stressed surface layer on the treated glass which is subject to penetration by simple abrasion is everyday use, thus rendering such articles mechanically unstable. Finally, the strength provided by such a layer is subject to degradation at elevated temperatures due to the release of the compressive stress as the strain point of the glass is reached.

Similar ion-exchange strengthening procedures have more recently been discovered for semicrystalline glasses or glassceramics, which are produced through the crystallization *in situ* of certain glasses containing crystallization-promoting or nucleating agents by the use of an appropriate heat treatment. However, the use of glass-ceramics has not overcome the inherent disadvantages of ion-exchange strengthening procedures.

Even more recently, commercially practicable methods have been discovered for producing laminated glass and glass-ceramic articles having compressively-stressed surface layers as the result of a thermal expansion mismatch between the core and surface layer glasses. U.S. Pat. No. 3,673,049 issued to Giffen et al. describes a method of forming a glass laminate at elevated temperatures so as to obtain intimate bonding or fusion of the core and adhered surface layers and thus, an interface which is essentially defect-free. Such a laminate depends for its strength upon a difference in thermal expansion between the core and surface glasses over the temperature range from about the setting point of the laminate to room temperature, such that the core will contract more than the surface layers upon cooling. In this way, a laminate having compressively-stressed surface layers and a tensilely-stressed core at room temperature is provided. Such articles are efficiently manufactured from relatively inexpensive starting materials, but since they generally incorporate at least one high expansion material to provide a sufficient expansion mismatch, their thermal shock resistance is not good. Furthermore, the strength provided by the compressively-stressed surface layer at room temperature is lost at elevated temperatures due to the same expansion mismatch, which causes a reversal of the stress buildup upon heating, so that such articles do not offer good high temperature strength. The use of low-expansion thermally-crystallizable glasses or glass-ceramics in forming the laminate, although somewhat helpful in improving thermal shock resistance, does not avoid the loss of strength at elevated temperatures which occurs as the inevitable result of the presence of a substantial thermal expansion mismatch.

It is accordingly the principal object of the present invention to provide strengthened glass-ceramic articles offering not only high strength, mechanical stability and good thermal shock resistance at room temperature, but also excellent strength retention at high temperatures.

It is a further object of the present invention to provide a method of making such articles which can be employed simply and economically using a wide variety of glass-ceramics of differing chemical and physical properties to provide strengthened products having desirable characteristics.

Other objects and advantages of the present invention will become apparent to those skilled in the art from the following detailed description, and from the appended drawings showing in schematic form several embodiments of the mechanism by which strengthening is achieved according to the present invention.

SUMMARY OF THE INVENTION

Briefly, our invention comprises a novel method of strengthening glass-ceramic articles by providing them with a glass-ceramic skin which densifies to a lesser extent than the core glass-ceramic upon crystallization *in situ*. Strengthening occurs during crystallization as the result of compressive stresses in the skin which arise, not out of a thermal expansion mismatch between the core and skin material, but out of a greater volume shrinkage of the core glass-ceramic with respect to the glass-ceramic skin, which results from phase transformations occurring in the core and skin materials during the crystallization heat treatment. Alternatively, the skin may be a glass which expands during conversion to a glass-ceramic. Thus, advantage is taken of the fact that most thermally-crystallizable glasses undergo volume changes during crystallization as the result of phase transformations occuring in the glass during thermal conversion to the glass-ceramic state. In most cases, the volume change is negative due to the densification of the glass as the result of the formation of high-density crystalline phases therein.

Normally, the strengthened glass-ceramics of the invention will be produced by laminating a thermally-crystallizable core glass with a different thermally-crystallizable glas to form a surface layer which substantially envelops the core glass and is fused thereto, and which densifies to a lesser extent or expands to a greater extent than the core glass upon crystallization

*in situ.* Lamination is carried out above the softening point of one or both of the glasses so that the desired fusion of core and surface layer is obtained. In this way, articles can be produced having surface layers as thick as desired so that they will be resistant to damage by abrasion. Furthermore, since the compressive stresses in the surface layer do not result from a thermal expansion mismatch between the core and surface layers, very low expansion glass-ceramics may be used which can provide an article with extremely high thermal shock resistance. And finally, the use of core and surface layer glass-ceramics having similar thermal expansion characteristics and high-temperature stability permits the manufacture of strengthened articles which will retain high strength even at temperatures ranging up to about 1,000°C., since the densification differential giving rise to the surface compression layer is produced by permanent phase transformations which are not subsequently affected by high temperatures or temperature cycling.

In selecting glass-ceramics suitable for the preparation of strengthened articles according to the present invention, the magnitudes of the relative densities of the core and surface materials are not important, the core may be either more or less dense than the surface layer without affecting the ultimate strength of the article. However, the degree to which each of the materials under consideration for the laminate changes in density upon thermal treatment must be known or measured, and the materials chosen so that the net differential density change of the core with respect to the skin will be positive. In other words, the core must shrink or densify more than the surface layer or the surface layer must expand more than the core during conversion to the glass-ceramic state, so that the surface layer will be in compression.

It is also important from the standpoint of high temperature strength that the thermal expansion characteristics of the crystallized core and surface layer be somewhat similar. If the surface layer expands substantially more than the core upon heating, some of the compressive surface stress in the laminated article will be lost at elevated temperatures. For this reason it is preferred that the difference in coefficient of thermal expansion between the crystallized core and surface layer glass-ceramics be no greater than about $8 \times 10^{-7}/°C$. and most preferably less than about $5 \times 10^{-7}/°C$.

FIG. 1 sets forth in schematic form the mechanism by which strengthening may occur during the nucleation and crystallization of a laminated glass-ceramic article according to the invention. Line T represents a plot of relative temperature vs. time for a typical heat treatment, wherein the lower plateau represents a hold at the nucleation temperature and the upper plateau a hold at the crystallization temperature. Superimposed on that plot are plots of relative density vs. time for suitable core (line $D_c$) and surface layer (line $D_s$) glass-ceramics, wherein $D_{ci}$ and $D_{cf}$ are the initial and final densities of the core, $D_{si}$ and $D_{sf}$ the initial and final densities of the surface layer, and $\Delta D_c$ and $\Delta D_s$ the relative density changes of the core and surface layer, respectively. It can be seen that, since $\Delta D_c$ is larger than $\Delta D_s$, the core material has densified to a greater extent than the surface layer upon heat treatment, with most of the volume change occurring subsequent to nucleation and during the early stages of crystallization, thus placing the surface layer under compressive stress and strengthening the laminate.

Other embodiments of the invention are shown in FIGS. 2 and 3 of the drawing, wherein all of the designations are the same as for FIG. 1. In FIG. 2, the core is less dense on an absolute scale than the skin; nevertheless, strengthening is obtained because the core densifies to a greater extent than the skin during crystallization and/or subsequent phase transformation.

In FIG. 3, the core material undegoes no volume or density change during crystallization; however, the skin glass-ceramic actually expands during crystallization due to the formation of low density crystal phases therein, thus demonstrating a negative density change. This gives rise to a compressive stress which strengthens the laminated article. In all of the figures, density changes resulting from thermally-induced volume changes are not shown.

In each of the three embodiments shown, the value of the change in density of the core ($\Delta D_c$) is greater than the value of the changing density of the skin ($\Delta D_s$); i.e., the value of the expression $\Delta D_c - \Delta D_s$ is positive. More specifically, where $D_{ci}$ is the density of the core glass-ceramic prior to crystallization *in situ* and $D_{cf}$ is the density of the core after crystallization, as determined by calculation or experiment, and where $D_{si}$ is the density of the skin glass-ceramic prior to crystallization and $D_{sf}$ the density of the skin thereafter, also as determined by calculation or experiment, we have found that the value of the expression $$\left( \frac{D_{cf} - D_{ci}}{D_{ci}} - \frac{D_{sf} - D_{si}}{D_{si}} \right)$$

must be positive for differential densification strengthening to occur.

In all instances throughout the present specification and claims wherein the density values $D_{ci}$, $D_{cf}$, $D_{si}$, and $D_{sf}$ are used to calculate the relative density changes of the core and surface layers, the density changes of interest are only those occurring as the result of the transformation of the core and surface layers from the amorphous to the semicrystalline state, and not those arising out of changes in temperature. The effect of temperature changes on stress distribution in the present system is normally small due to the similar thermal expansion characteristics of the core and surface layer glass-ceramics. For these reasons, thermal effects are ignored in the above calculations of differential densification and the density values employed are all as measured or calculated at equivalent temperatures. Suitably, the density values used are those calculated for the glass and glass-ceramic materials at a selected temperature in the crystallization range of the core and surface layer components, since it is at crystallization temperatures where the stress-producing density changes occur. The crystallization ranges of the various glass-ceramics are known in the art, and the selection of any convenient temperature in those ranges, for example, the actual temperature selected for crystallization of the glass-ceramic laminate, is useful for calculating the densities to be used in determining the extent of differential densification as hereinabove described. Glass-ceramics to be included in the laminate according to the invention may therefore be selected on the basis that there densities $D_{ci}$, $D_{cf}$, $D_{si}$, and $D_{sf}$ at the temperature selected for crystallization of the laminate have values satisfying the differential densification limitations set forth herein.

As a practical matter, however, room temperature density values may be employed to closely approximate the densification differential since the errors due to thermal effects in these systems is normally small.

Calculations of the stresses arising in laminated rods or cane strenthened by the method of differential densification indicate that for every 0.1% of differential densification into a laminate, an increase in modulus of rupture approximating about 4,000 psi over the inherent strength of the material can theoretically be obtained. However, various factors limit the actual strength obtainable through the method, as will hereinafter more fully appear, so that percent densification differentials between core and skin ranging from about 0.1% up to about 20% or even higher may be required in some cases in order to produce acceptably high strengths.

DESCRIPTION OF THE PREFERRED EMBODIMENTS

Figure 1:
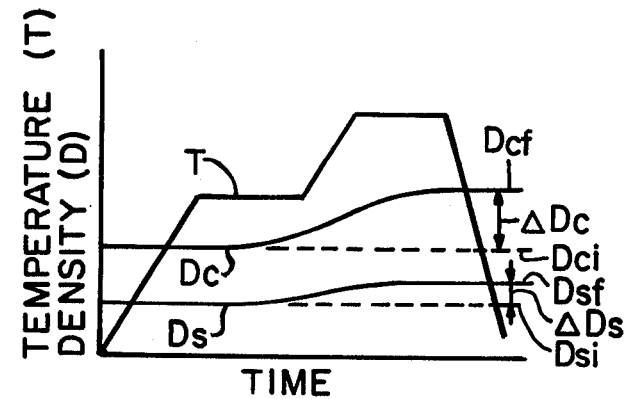
Figure 2:
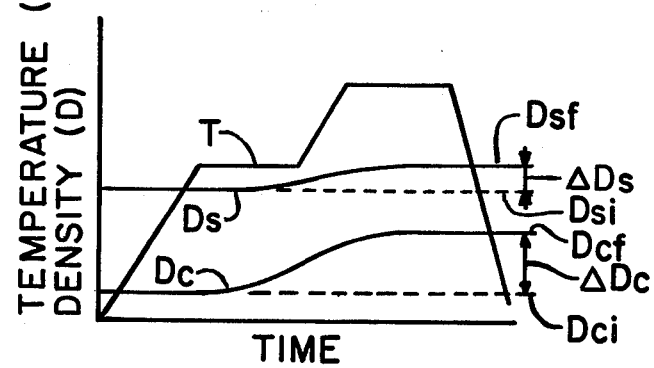
Figure 3:
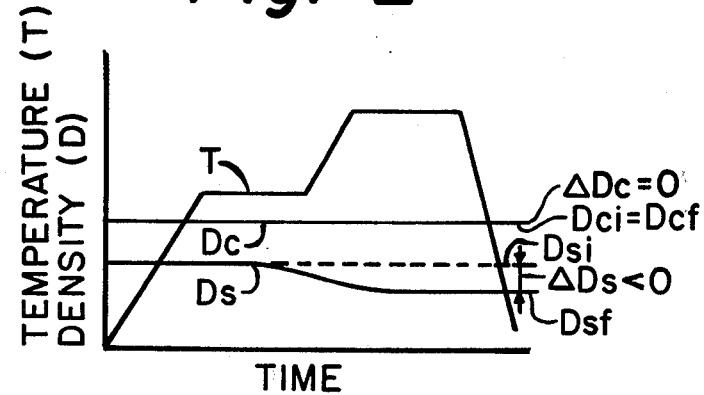

We have found that, although the compositions and crystal phases present in the core and surface layer glass-ceramics are not critical in obtaining strengthening according to the present invention, certain physical requirements of the core and skin should be met in order to increase the strength of the composite article. Thus, in addition to the requirement that the core demonstrate a net positive differential density change with respect to the skin upon crystallization, the skin glass-ceramic should have a high viscosity or creep resistance at crystallization temperatures so that stress relaxation during heat treatment will be minimized. Hence, it is preferable that the glass crystallize to very high crystallinity before the densification of the core occurs, and that the crystallized surface layer exhibit good creep resistance, i.e., resistance to flow stimulated by the contraction of the core. Otherwise, the creep of the skin would cause the release of surface compression. Thus, it is preferable that the skin glass crystallize faster and/or at lower temperatures as well as at higher viscosity than the core glass, although even in that case some stress relaxation will probably occur in the surface layer due to the high temperature thermal treatments required in converting glasses to glass-ceramics.

It is also preferable but not necessary that the core material be equal or slightly higher in thermal expansion than the skin material both before and after crystallization, since otherwise, the resulting surface tensile stresses will detract from the surface compression and decrease the strengthening effect of the densification differential.

We have found that a calculated densification differential of at least 0.5% between the core and skin materials should be provided if appreciable increases in body strengths are to be achieved. For the purpose of the present invention, the percent densification differential (D) is calculated from the equation $$D = \left( \frac{D_{cf} - D_{ci}}{D_{ci}} - \frac{D_{sf} - D_{si}}{D_{si}} \right) \times 100$$

wherein $D_{si}$, $D_{sf}$, $D_{ci}$, and $D_{cf}$ are the initial and final densities of the skin and the initial and final densities of the core respectively, as determined by calculation or experiment. Thus, D must be positive and should preferably be equal to at least about 0.5% if the densification differential is to have significant effect on the strength of the article. More preferably, D will range between about 1 – 5%. Values as high as about 20% may be employed when the resistance of the surface layer to stress relaxation upon heat treatment is low.

From the practical standpoint, densification is achieved by varying composition and/or thermal treatment so that either the principal crystalline phase of the core is of higher density than the principal crystalline phase of the skin, or more of a highly dense minor crystalline phase will be formed in the core than in the skin. Thus, in $Li_2O-Al_2O_3-SiO_2$ glass-ceramics having beta-spodumene solid solution as the principal crystalline phase, increasing $Li_2O \cdot Al_2O_3$ content results in the formation of a highly stuffed lattice and, hence, a less dense solid solution due to an increase in lattice spacing. Cordierite glass-ceramics ($MgO-Al_2O_3-SiO_2$) are generally suitable for use as a skin material because they density very little or expand slightly upon crystallization and also crystallize at very high viscosity.

Dispersion of very dense minor phase in the core is perhaps the easiest way to increase the core/skin densification differential. Thus, the presence of such dense phases as gahnite ($ZnAl_2O_4$) a spinel ($MgAl_2O_4$) can be increased by only slight variations in composition. The amount of densification can be easily controlled by the amount of such dense oxides.

The selection of a suitable heat treatment to cause crystallization *in situ* of the strengthened glass-ceramic articles of the invention is a routine matter, but one which should be undertaken with due regard for the types of thermally-crystallizable glasses employed. The various heat treatments suitable for each of the various kinds of glass-ceramics are well known, generally involving a nucleation stage during which the article is heated at a temperature sufficient to cause the separation of nucleating phases within the glass for a time sufficient to achieve the desired degree of nucleation, and a crystallization stage during which the article is further heated at a temperature sufficient to cause the growth of crystals commencing at the nucleation sites for a time sufficient to achieve the desired degree of crystallization. Optionally, as is well known, the heat treatment may instead be carried out as a continuous heating process, with nucleation and crystallization occurring as the article is heated to crystallization temperatures. The only restriction on prior art heat treatment methods as applied to the present invention is that they must not involve crystallization treatments so extreme as to result in complete stress relaxation in the surface layer during the crystallization treatment. Stress release is both time and temperature dependent, occurring slowly at temperatures above the strain point and with increasing rapidity at temperatures approaching the softening point of the material. Hence, the crystallization temperature selected must be sufficient to cause crystallization in the laminated article giving rise to a positive densification differential, but below that temperature at which complete stress relaxation will occur in the surface layer in the course of the crystallization heat treatment.

Table I lists several examples of composite articles strengthened according to the present invention by the method of differential densification. The modulus of rupture strengths shown at the various temperatures were determined on abraded cane samples. The glass-ceramic materials themselves have abraded strengths of about 10,000–14,000 psi in the crystallized but unstrengthened state. Also included in the table are the thermal expansion of the core and skin glass-ceramics, expressed as an average over the range from room temperature to about 700°–800°C., the thermal treatment employed in crystallizing each sample, the crystalline phases present in the core and skin glass-ceramics as determined by X-ray diffraction, and the percent densification differential as calculated from the initial and final densities of the core and skin materials.

The cane samples were produced by a process wherein a molten glass core was coated by thin layers of molten skin glass by drawing through a multiple orifice to produce cylindrical rods about 0.100–0.250 inch in diameter (usually about 0.200 inch) having cylindrical surface layers about 0.005 inch in thickness. The heat treatment values given in Table I are the holding temperatures and times of the nucleation and crystallization stages of the treatment. These holding temperatures were approached at a rate ranging from 100° to 300°C. per hour, and the samples were cooled at a rate of about 300°C. per hour after completion of the crystallization hold.

TABLE I

| | 1 | | 2 | | 3 | |
|---|---|---|---|---|---|---|
| | CORE | SKIN | CORE | SKIN | CORE | SKIN |
| $SiO_2$ | 72.2 | 72.5 | 65.8 | 72.5 | 69.7 | 68.0 |
| $Al_2O_3$ | 20.4 | 22.5 | 19.5 | 22.5 | 17.9 | 20.5 |
| $Li_2O$ | 2.0 | 3.0 | 3.6 | 3.0 | 2.7 | 3.5 |
| MgO | 5.4 | 4.0 | 1.8 | 4.0 | 2.6 | 1.7 |
| ZnO | — | — | 2.2 | — | 1.1 | 1.2 |
| $TiO_2$ | 4.0 | 4.5 | 4.3 | 4.5 | 4.7 | 4.7 |
| $ZrO_2$ | 1.5 | — | — | — | 0.1 | — |
| $B_2O_3$ | — | — | 2.0 | — | — | — |
| $Na_2O$ | — | — | 0.3 | — | 0.3 | — |
| $As_2O_3$ | 0.75 | 0.75 | 1.0 | 0.75 | 0.9 | 0.4 |
| $K_2O$ | — | — | — | — | — | — |
| Crystalline Phases | β-quartz spinel rutile, $ZrO_2$ | β-quartz β-spodumene cordierite rutile | β-spodumene gahnite rutile | β-quartz β-spodumene cordierite | β-spodumene spinel rutile | β-spodumene anatase |
| Thermal Expansion ($\times 10^{-7}$/°C., RT-T°C.) | 18.5 (700°C.) | 14.8 (700°C.) | 23.0 (700°C.) | 14.8 (700°C.) | 15.0 (800°C.) | 13.5 (800°C.) |
| Heat Treatment | 780°C.-2 hrs. | 1000°C.-2 hrs. | 800°C.-2 hrs. | 900°C.-2 hrs. | 800°C.-2 hrs. | 1030°C.-2 hrs. |
| % Differential Densification | 4.8% | | 1.4% | | 0.9% | |
| Modulus of Rupture (psi) | | | | | | |
| R-T | 35,000 | | 70,000 | | 30–35,000 | |
| 500°C. | 37,000 | | — | | 25,000 | |
| 700°C. | 39,000 | | — | | 25,000 | |
| 800°C. | — | | — | | — | |

| | 4 | | 5 | | 6 | |
|---|---|---|---|---|---|---|
| | CORE | SKIN | CORE | SKIN | CORE | SKIN |
| $SiO_2$ | 69.7 | 65.10 | 68.8 | 68.7 | 69.3 | 72.0 |
| $Al_2O_3$ | 17.9 | 23.10 | 22.0 | 17.9 | 18.7 | 17.7 |
| $Li_2O$ | 2.7 | 3.77 | 2.9 | 3.3 | 3.6 | 4.5 |
| MgO | 2.6 | 1.77 | 1.2 | 1.4 | 0.3 | 0.3 |
| ZnO | 1.1 | 1.46 | 5.1 | 1.9 | 2.6 | 0.1 |
| $TiO_2$ | 4.7 | 2.01 | 3.5 | 5.5 | 4.5 | 4.4 |
| $ZrO_2$ | 0.1 | 1.89 | 1.5 | — | — | — |
| $Na_2O$ | 0.3 | — | — | 0.3 | — | — |
| $As_2O_3$ | 0.9 | 0.75 | 0.75 | 1.0 | — | — |
| $K_2O$ | — | 0.15 | — | — | — | — |
| Crystalline Phases | β-spodumene spinel rutile | β-spodumene spinel $ZrO_2$, rutile | β-quartz β-spodumene $ZrO_2$, rutile spinel | β-spodumene spinel anatase | β-spodumene gahnite rutile | β-spodumene anatase |
| Thermal Expansion ($\times 10^{-7}$/°C., RT-T°C.) | 15.0 (800°C.) | 12.0 (800°C.) | 16.8 (700°C.) | 9.0 (800°C.) | 5.7 (800°C.) | 5.7 (800°C.) |
| Heat Treatment | 800°C.-2 hrs. | 1030°C.-2 hrs. | 800°C.-2 hrs. | 1000°C.-2 hrs. | 800°C.-2 hrs. | 1130°C.-2 hrs. |
| % Differential Densification | 1.6% | | 2.8% | | 2.0% | |
| Modulus of Rupture (psi) | | | | | | |
| R-T | 29,000 | | 35,000 | | 26–32,000 | |
| 500°C. | — | | — | | — | |
| 700°C. | — | | 26,000 | | — | |
| 800°C. | — | | — | | 24–28,000 | |

Example I of Table I shows the effectiveness of the differential densification method in providing strengthened articles which retain their strength at elevated temperatures, conclusively showing that the strengthening is not due to the thermal expansion mismatch. Thus, the observed strength not only increases with temperature, but is also far above that which could be attributed to the measured difference in thermal expansion. The fact that the observed strength of 35,000 psi is well below the theoretical strength of laminated cane having a 4.8% densification differential is attributed to stress relaxation in the skin during heat treatment. The observed densification differential is due to a higher MgO content in the core leading to the formation of a dense minor spinal phase (MgAl$_2$O$_4$), and also to a higher Li$_2$O and Al$_2$O$_3$ content in the skin which results in a highly-stuffed, comparatively low-density beta-spodumene s.s. phase containing some cordierite. In this composite, the skin has a more advanced phase assemblage than the core, due to the increased presence of Li$_2$O which promotes the formation of beta-spodumene s.s. at lower temperatures.

Example 2 shows a room temperature strength of about 70,000 psi, which is approximately equal to the theoretical strength obtainable from the calculated percent densification differential of about 1.4%. The reason for such high strength is probably the fact that the laminate was crystallized at a comparatively low temperature of about 900°C.; thus, stress relaxation is reduced considerably. However, the thermal expansion differential of about $8 \times 10^{-7}/°C$. between the core and skin could give rise to strengthening of, at the most, about 10,000 psi. This strengthening, when added to Example 5 shows strengthening of about 25,000 psi over the inherent strength of the body at room temperature, but about 8,000 psi of this strength may be attributed to the thermal expansion mismatch between the core and skin. The differential densification strengthening is due to increased spinel formation in the core on account of the higher ZnO content, and to the retention of some beta-quartz in the core after ceramming, which is somewhat higher in density than the spodumene phase.

Example 6 shows how differential densification strengthening can be used to strengthen a glass-ceramic system of very low thermal expansion. High ZnO and low Li$_2$O in the core composition results in higher densification due to the greater amount of gahnite and more siliceous beta-spodumene s.s. than the skin composition. Rutile formation in the core and anatase in the skin also contribute to the densification differential, since rutile has much higher density than anatase. This laminated system could not have been strengthened by the negligible thermal expansion differential.

Other systems which may be strengthened by the method of differential densification through a process of core contraction and/or skin expansion include the following:

|  | 7 | | 8 | |
|  | CORE | SKIN | CORE | SKIN |
| --- | --- | --- | --- | --- |
| SiO$_2$ | 62.2 | 62.8 | 65.2 | 46.8 |
| Al$_2$O$_3$ | 26.0 | 26.4 | 20.8 | 28.2 |
| Li$_2$O | 4.7 | 4.7 | 2.8 | — |
| MgO | — | — | 1.2 | 13.2 |
| ZnO | — | — | 4.8 | — |
| TiO$_2$ | 5.1 | 5.1 | 3.3 | 11.4 |
| ZrO$_2$ | — | — | 1.4 | — |
| As$_2$O$_5$ | 1.0 | 1.0 | 0.5 | 0.4 |
| F | 1.0 | — | — | — |
| Crystal Phases | β-spodumene, rutile, mullite, topaz | β-spodumene, rutile, mullite | β-spodumene, β-quartz, α-quartz, spinel, rutile, zirconia | cordierite rutile |
| Thermal Expansion ($\times 10^{-7}/°C$.) | 20 | 13 | 18 | 20 |
| Heat Treatment | 800°C.-4 hours | 1100°C.-4 hours | 800°C.-2 hours | 1100°C.-2 hours |
| % Densification Differential | | 1.4% | | 12.0% |
| Estimated Strength (MOR-psi) | | 50,000 | | 40,000 | the inherent strength of the body (about 10,000 psi), leaves about 50,000 psi attributable to differential densification strengthening. This differential is primarily due to the small amount of very dense gahnite (ZnAl$_2$O$_4$) formed in the core glass-ceramic.

Example 3 shows strengthening of about 20,000 psi over the inherent strength of the body, or approximately 50% of the theoretical strength expected from the 0.9% densification differential. Here, the thermal expansion differential of about $1.5 \times 10^{-7}/°C$. would cause only negligible strengthening. The densification differential primarily results from the higher Li$_2$O.Al$_2$O$_3$ content of the skin leading to higher beta-spodumene s.s. stuffing, and to some spinel formation in the core.

Example 4 shows a room temperature strength of about 29,000 psi, which is about 19,000 psi over the inherent strength of the body. This strengthening is attributable to a densification differential of about 1.6% which arises primarily because the higher Al$_2$O$_3$ and Li$_2$O content of the skin produces a more highly stuffed beta-spodumene crystalline structure and, hence, less densification, during crystallization.

In Example 7, strengthening is attributable primarily to the formation of a very dense topaz phase in the core material, although the thermal expansion mismatch would also provide some additional strength. Example 8 represents a case in which skin expansion plays a significant role in producing a densification differential. In this laminate, core contraction provides a densification of about 7.4% and skin expansion accompanying the formation of cordierite contributes a negative densification (expansion) of —4.7%. The percent densification differential of about 12% provides a significant strengthening effect.

The use of differential densification strengthening provides not only high temperature strength retention, but also a higher degree of physical stability than is provided in chemically strengthened articles. The use of laminated system permits the manufacture of strengthened articles having surface layers as thick as is required to provide the desired degree of abrasion resistance. While no precise maximum surface layer thickness may be established, we have found that the ratio of skin cross-sectional area to core cross-sectional area should be less than about 1:5, and will normally range between about 1:10 and 1:30. Skin thickness should be greater than about 2 mils, and preferably at least about 5 mils for good abrasion resistance.

From the preceding description and examples it is apparent that numerous variations and modifications may be employed, particularly with regard to the compositions and properties of the core and surface layer materials, in order to take advantage of differential densification in obtaining a strengthened glass-ceramic article. The composition examples shown are merely illustrative of the variety of glass-ceramics which may be employed, and the scope of the invention is intended to be limited only as defined in the appended claims.

We claim:

1. A strengthened laminated glass-ceramic article comprising a glass-ceramic core portion and a compressively-stressed glass-ceramic surface layer laminated to and substantially enveloping said core portion, wherein
   a. the difference in thermal expansion coefficient between the core and surface layer glass-ceramics is less than about $5 \times 10^{-7}/°C.$;
   b. the glass-ceramic core portion is formed of a composition having at a selected crystallization temperature a density $D_{ci}$ prior to crystallization *in situ* and a density $D_{cf}$ subsequent thereto;
   c. the compressively-stressed glass-ceramic surface layer is formed of a composition having at said crystallization temperature a density $D_{si}$ prior to crystallization *in situ* and a density $D_{sf}$ subsequent thereto; and wherein
   d. the values of the densities $D_{ci}$, $D_{cf}$, $D_{si}$, and $D_{sf}$ are such that the present value of the densification differential (D) as defined by the expression:

$$D = \frac{D_{cf} - D_{ci}}{D_{ci}} - \frac{D_{sf} - D_{si}}{D_{si}} \times 100$$

is positive.

2. A strengthened laminated glass-ceramic article according to claim 1 wherein D has a value in the range of about 0.5–20%.

3. A strengthened laminated glass-ceramic article according to claim 2 wherein D has a value in the range of about 1–5%.

4. A strengthened laminated glass-ceramic article according to claim 2 wherein the core and compressively-stressed surface layer glass-ceramics are composed of $Li_2O—Al_2O_3—SiO_2$ compositions wherein the principal crystal phases are selected from the group consisting of beta-quartz and beta-spodumene solid solutions.

* * * * *